(12) United States Patent
Centurioni et al.

(10) Patent No.: US 10,330,248 B2
(45) Date of Patent: Jun. 25, 2019

(54) RAIL SYSTEM FOR A CAMERA

(71) Applicant: Patrick Centurioni, Innsbruck (AT)

(72) Inventors: Patrick Centurioni, Innsbruck (AT); Martin Steger, Graz (AT)

( * ) Notice: Subject to any disclaimer, the term of this patent is extended or adjusted under 35 U.S.C. 154(b) by 0 days.

(21) Appl. No.: 15/279,693

(22) Filed: Sep. 29, 2016

(65) Prior Publication Data

US 2017/0146184 A1 May 25, 2017

Related U.S. Application Data

(63) Continuation of application No. PCT/AT2015/000053, filed on Apr. 3, 2015.

(30) Foreign Application Priority Data

Apr. 4, 2014 (AT) ..................... 253/2014

(51) Int. Cl.
| | |
|---|---|
| *F16M 11/42* | (2006.01) |
| *B61B 13/00* | (2006.01) |
| *F16M 13/02* | (2006.01) |
| *G03B 17/56* | (2006.01) |

(52) U.S. Cl.
CPC ........... *F16M 11/425* (2013.01); *B61B 13/00* (2013.01); *F16M 13/022* (2013.01); *G03B 17/561* (2013.01)

(58) Field of Classification Search
CPC .... F16M 11/425; F16M 13/022; B61B 13/00; G03B 17/561
USPC ........................................................ 396/419
See application file for complete search history.

(56) References Cited

U.S. PATENT DOCUMENTS

| | | | | |
|---|---|---|---|---|
| 3,680,777 | A * | 8/1972 | Arai | A63H 18/021 |
| | | | | 238/10 E |
| 4,260,104 | A * | 4/1981 | Schaffan | A63H 19/30 |
| | | | | 238/10 E |
| 4,943,821 | A | 7/1990 | Gelphman | |
| 5,794,846 | A | 8/1998 | Barrett | |
| 6,523,957 | B1 | 2/2003 | Walton et al. | |
| 8,721,199 | B1 * | 5/2014 | Hart | F16M 11/045 |
| | | | | 396/428 |
| 10,054,257 | B1 * | 8/2018 | Snoke | F16M 11/425 |
| 2005/0231689 | A1 * | 10/2005 | Longley | F16M 11/08 |
| | | | | 352/243 |

FOREIGN PATENT DOCUMENTS

JP           9-41303         2/1997

OTHER PUBLICATIONS

"Model Train Camera—(1st person view)" https://www.youtube.com/watch?v=-L8XCPldaDk (Year: 2010).*
International Search Report dated Aug. 28, 2015 in International (PCT) Application No. PCT/AT2015/000053.
Search Report dated Jan. 29, 2015 in Austrian Application No. A 253/2014, with English translation.

* cited by examiner

*Primary Examiner* — Clayton E. LaBalle
*Assistant Examiner* — Dennis Hancock
(74) *Attorney, Agent, or Firm* — Wenderoth, Lind & Ponack, L.L.P.

(57) ABSTRACT

A rail system for a camera includes at least one guide rail on which a camera slider is movably mounted. A support structure consists of multiple hingedly interconnected segments. The support structure is provided along the at least one guide rail, and the segments are in contact with the at least one guide rail.

16 Claims, 11 Drawing Sheets

RAIL SYSTEM FOR A CAMERA

BACKGROUND OF THE INVENTION

The invention concerns a rail system for a camera.

Such rail systems are already state of the art and are disclosed, for example, in U.S. Pat. No. 6,523,957. Camera guides on rail systems have been developed in recent years as an extremely popular aid in the film and photographic industry. The high range of use for product and advertising films has increased just like use in nature film. Here, reference is to be made in particular to the use of camera guides (rail systems, sliders) in regard to popular time lapse videos (time lapse recordings). There are various products on the market which guide a camera slider on a linear rail system. Rail systems with which it is possible to travel along a curve are rather poor, and by virtue of the rigid structure can only be limitedly used for special themes.

Rail systems for cameras have the disadvantage that they are severely limited in flexibility. The rails are rigid and cannot be adapted to the environment. If, for example, there should be a wish to photograph an object with a camera and to move the camera in a circular path around the object, the circular path cannot be readily adapted in its radius to the size of the object. If the object, for example, is small, a tighter circle is advantageous while in the case of a large object a larger circle is required. In addition rails are found to be bulky, and transport of the bulky rail system is found to be extremely complicated. The structure of the rail systems is also to be considered highly complex. Often the rail systems which comprise a plurality of individual parts are of low stability. Linear guide systems can only be used for linear movements and not for a movement of a camera slider for example on a circular arc. Conversely, it is also not possible to use a camera guide rail which is shaped with curves for linear movement at the camera.

SUMMARY OF THE INVENTION

The object of the invention is to avoid the above-described disadvantages and to provide a rail system which is improved over the state of the art. If segments are in connected relationship with at least one guide rail, the arrangement of the individual segments can be altered in their form and the guide rail can be adapted.

In that case, it has proven to be particularly advantageous if two flexible guide rails are provided along the carrier structure, wherein the carrier structure is disposed between the flexible guide rails. The carrier structure ensures a high level of stability for the rail system, and the flexible guide rails arranged thereon can be altered in their form, with the carrier structure which is moveable in itself.

If the at least one guide rail is mounted moveably—preferably slidably—relative to the carrier structure, then the guide rail is not upset or stretched by the change in the geometry of the carrier structure. If the carrier structure is curved, for example, in a circular arc, then the inner guide rail can move freely along the carrier structure by virtue of the displaceable mounting of the guide rail. In that case, the outer guide rail is not stretched but can also move freely along the carrier structure.

In that respect, it has proven to be particularly advantageous if an arresting device for inhibiting the relative mobility between the at least one guide rail and the carrier structure is provided. The rail system is locked in itself in respect of shape by activation of the arresting device. If the rail system is shaped for example in a circular arc and then blocked by the arresting device, then it remains in that circular shape because the at least one guide rail cannot move relative to the carrier structure. If the arresting device is released, the rail system can be moved back into a linear shape again and serves as a linear camera guide system.

If the rail system has an end portion, wherein the at least one guide rail is mounted moveably—preferably slidably—in the end portion, then the ends of the guide rail are stowed in the end portion. The guide rails remain in the structure of the end portion after bending of the rail system and do not project beyond the same.

If an arresting device is arranged in the end portion, it can be easily reached, it does not impede the movement of the camera slider, and the rail system can be arrested or opened at that readily accessible location in order to change or maintain the form of the rail system.

If the plurality of segments are connected together by axis members, the rail system can be easily changed in form, and a curved structure can be produced from a linear structure.

In that respect, it has proven to be particularly advantageous if the at least one guide rail is formed from a flexible plastic, a plastic compound, and/or a flexible metal. The easy deformability of those materials ensures a simple configurational shape for the rail system. In addition, a plastic—in particular of a flexible nature—has damping properties if the rollers of the camera slider move thereon. No troublesome noise is produced when the camera slider rolls along, and the vibrations which are produced due to unevenness on the rail are in that case reduced to a minimum.

As the camera slider is mounted on rollers provided with rolling and/or sliding bearings on the at least one guide rail, displacement of the camera slider is simplified and rolling friction is reduced. In addition, no noise is produced in the rolling movement due for example to a badly mounted roller, which noise would be a severed disturbance when filming.

If the axes of rotation of the rollers are arranged in a horizontal plane and/or at an angle differing from the horizontal plane on the camera slider and/or the at least one guide rail, it is possible for the camera slider to be mounted in stable relationship. That therefore prevents the camera slider from tipping over or falling out of the rail system. That is also assisted by the at least one guide rail involving a T-shaped cross-section. If, for example, one of the rollers on the camera slider engages behind the overhang of the T-shaped cross-section, then the camera slider is prevented from tipping off the guide rail.

If the camera slider is displaceable by a drive unit—preferably an electric motor—on the rail system, it is then possible for movements on the rail system to be automatically implemented. The movement of the camera slider on the rail system can thus be matched in respect of time to the film sequence, which is highly advantageous in regard to special film effects.

BRIEF DESCRIPTION OF THE DRAWINGS

Further details and advantages of the present invention will be described more fully hereinafter by means of the specific description with reference to the embodiments illustrated in the drawings, in which.

DETAILED DESCRIPTION OF THE INVENTION

Figure 1A:
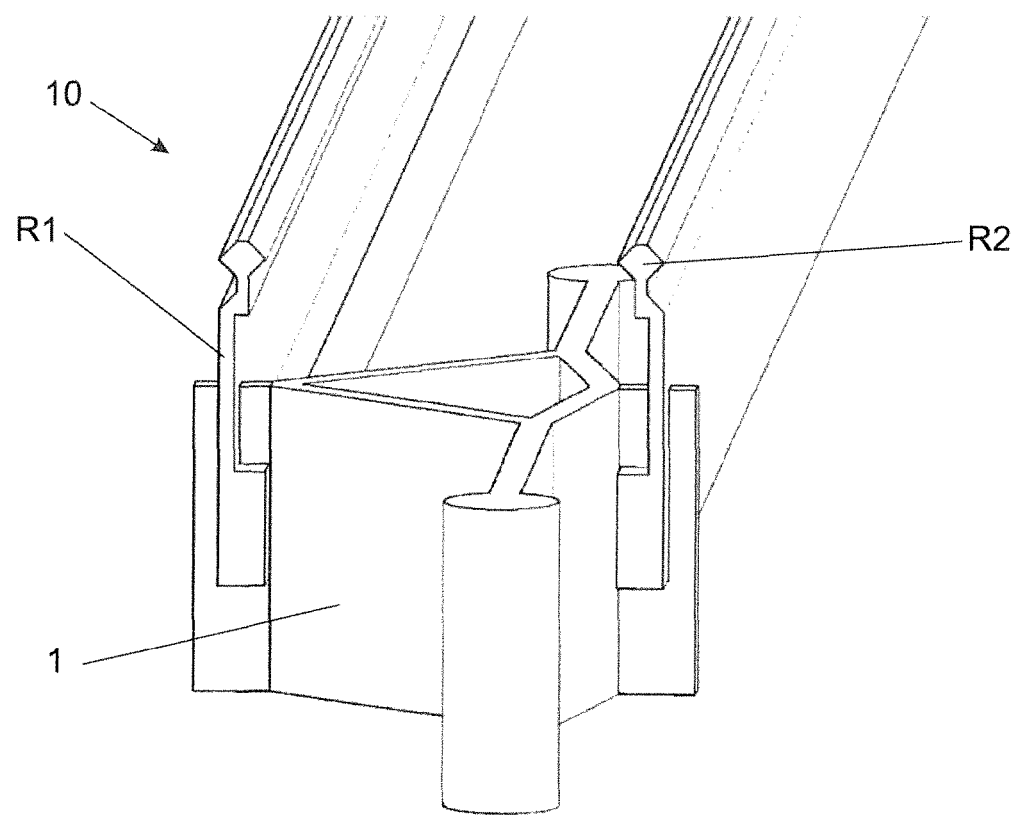
FIGS. 1a and 1b show a perspective view of a rail system with a segment.

FIG. 1a shows a segment 1 of a rail system 10 having a first guide rail R1 and a second guide rail R2. The carrying structure of the segments 1 is disposed between the guide rails R1, R2.

Figure 1B:
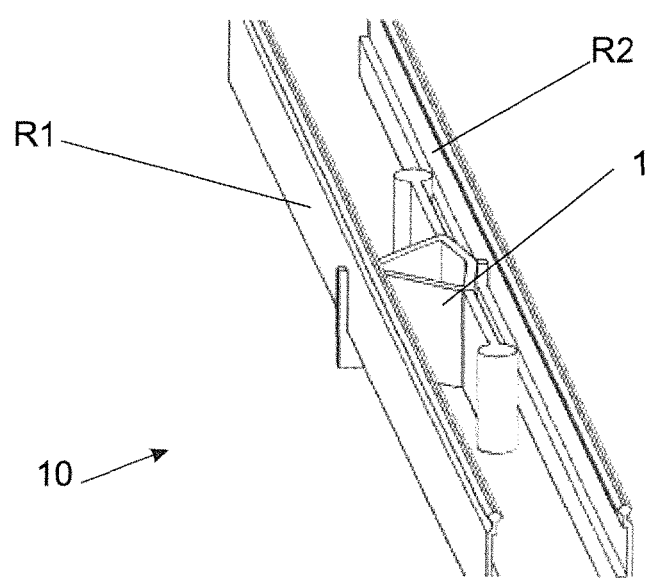

FIG. 1b shows the rail system 10 from a somewhat different point of view compared to FIG. 1a. The guide rails R1, R2 are mounted longitudinally moveably—slidably—in the individual segments 1.

Figure 2:
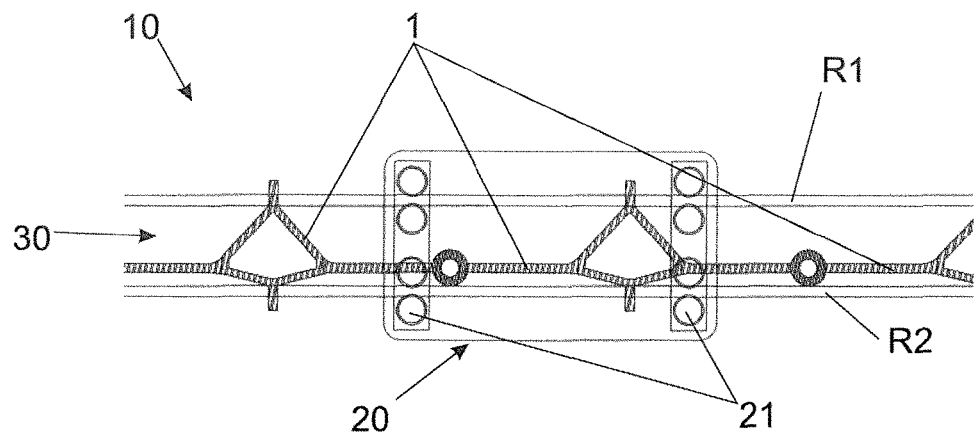
FIG. 2 shows a plan view of a rail system with camera slider.

FIG. 2 shows a plan view of a rail system 10 with a camera slider 20 mounted displaceably on the guide rails R1, R2 by way of rollers 21. The guide rails R1, R2 are mounted slidably on the carrier structure 30 and can be moved along the carrier structure 30. The carrier structure 30 comprises a plurality of individual segments 1 which are hingedly connected together by rotatable connecting elements, for example axis members (i.e., elongated pivot pins) A.

Figure 3:
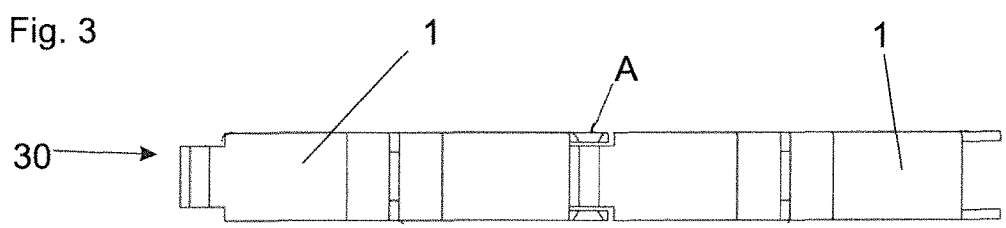
FIG. 3 shows a side view of a carrier structure.
Figure 4:
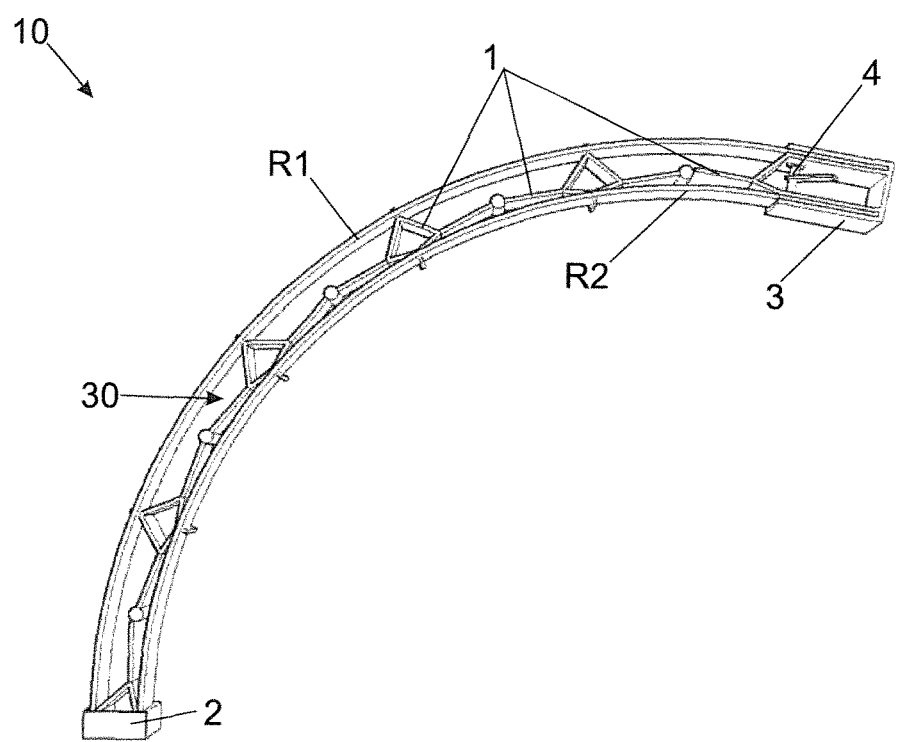
FIG. 4 shows a perspective view of a rail system.
Figure 12:
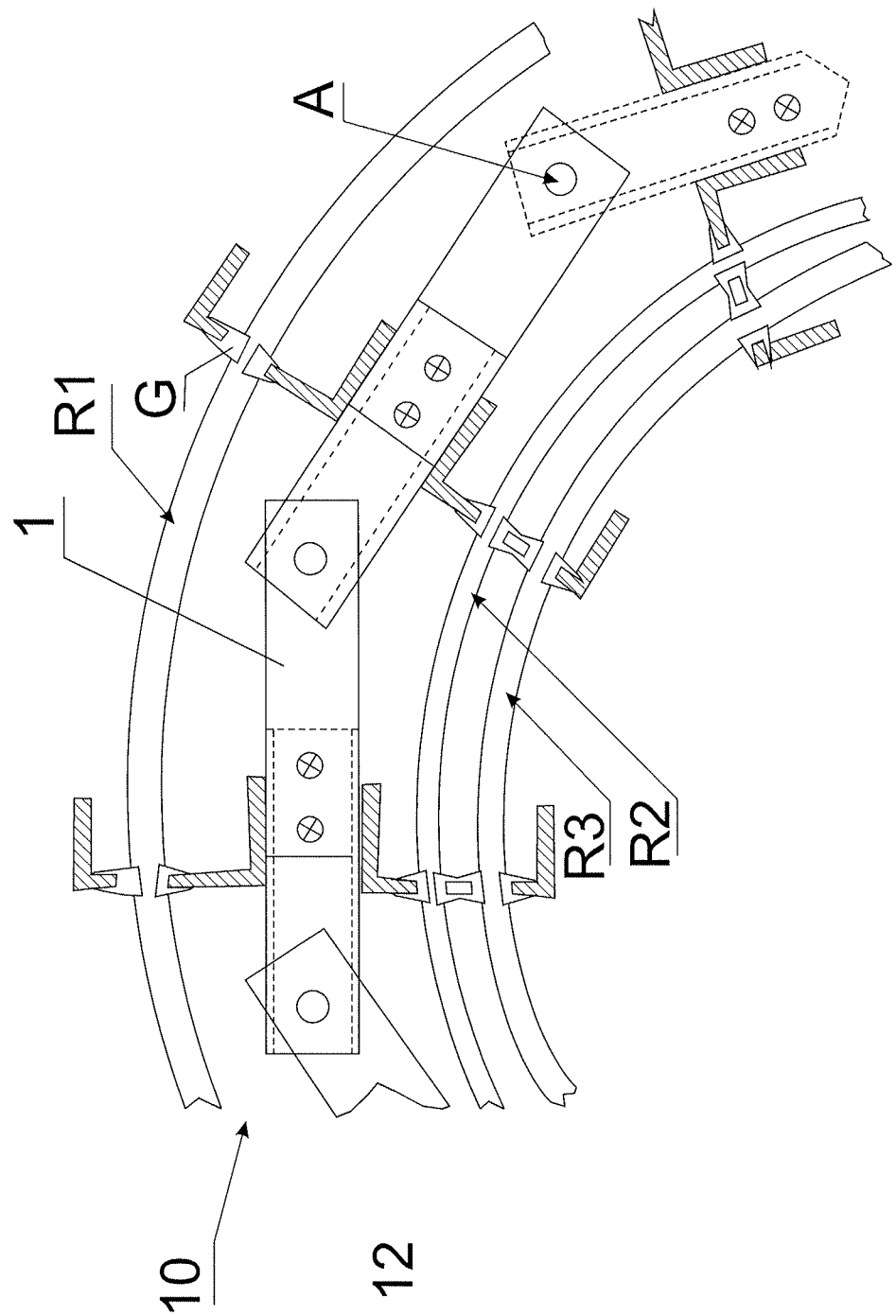
FIG. 12 shows a rail system curved.

FIG. 3 shows a side view of a carrier structure 30. The individual segments 1 are connected together by axis members (pivot pins) A. The segments 1 can move rotatably about the elongated pivot pin A. In particular, each pivot pin A has a longitudinal axis perpendicular with respect to a longitudinal axis of the carrier structure 30 as shown in FIG. 3, which causes the segments 1 to rotate relative to each other within the horizontal plane of the carrier structure 30 as shown in FIGS. 4 and 12. The height and width of each of the segments 1 as noted above provide rigidity (non-flexibility), particularly within a vertical plane. Furthermore, the arrangement of the elongated axis members (pivot pins) A as shown in FIG. 3 clearly prevents rotation or pivoting of the segments 1 relative to each other within the vertical plane or any plane not perpendicular to the axis members (pivot pins) A which, in this embodiment, means only the horizontal plane. Thus, the configuration and interconnection of the segments 1 is such that the segments 1 are rotatable relative to each other only within a single (in this case, horizontal) plane of the carrier structure 30.

FIG. 4 shows a rail system 10 having a carrier structure 30 on which the guide rails R1, R2 are longitudinally moveably mounted. The guide rails R1 and R2 are fixedly connected together in a mutually spaced relationship by way of a connecting portion 2. The connecting portion 2 is also fixedly connected to the carrier structure 30. An end portion 3 is disposed at the other end of the rail system 10. The guide rails R1, R2 are mounted moveably in the end portion 3. The carrier structure 30 is fixedly connected to the end portion 3.

If the rail system 10 is curved as shown in FIG. 4, then the inner guide rail R2 is upset. The upsetting is compensated for by a guide element of the end portion 3. In particular, the guide rail can move freely along the guide element of the end portion 3, until reaching a condition of abutment. The outer guide rail R1 is stretched in the circular arc shown in FIG. 4. The stretching is also compensated for by a guide element in the end portion 3, and an abutment on the end portion 3 and/or the guide rail R1 prevents the guide rail R1 from being pulled completely out of the end portion 3. When the bending radius to be reached is set, the rail system can be blocked by way of an arresting device 4 and thus remains in the most recent desired position. In other words, the arresting device 4 presses and holds the guide rails R1, R2 in position relative to the carrier structure 30 so as to ensure that the rail system retains its shape (see below and FIG. 6).

Figure 5:
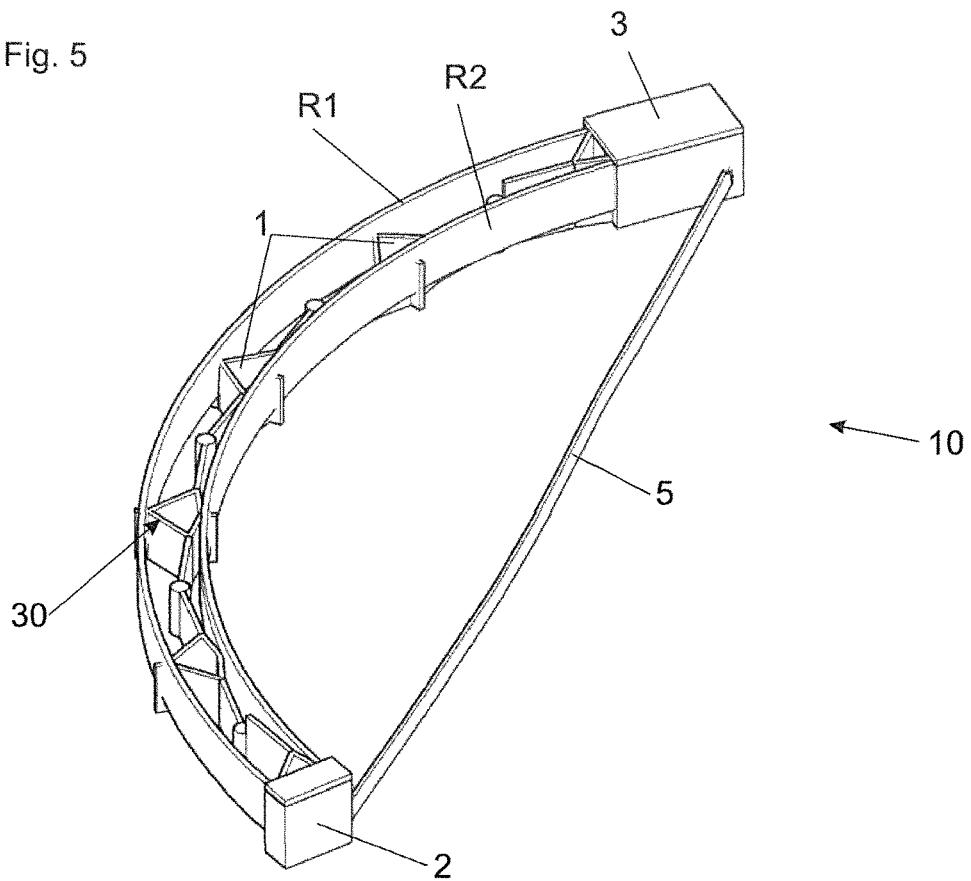
FIG. 5 shows a rail system with pulling element.

FIG. 5 shows a further embodiment of the rail system 10. In this case, the circular arc is not held in its form by an arresting device 4 (not visible in FIG. 5). Instead, the circular arc is held in its form by a pulling element 5 whose length is adjustable, and so the desired radius can be set at the rail system 10. In that case, as also shown in FIG. 4, the carrier structure 30 which is composed of individual segments 1 is curved. The guide rails R1 and R2 adapt to the desired circular arc by virtue of their longitudinal mobility relative to the carrier structure 30. The loose ends of the guide rails R1, R2 open in the end portion 3 and are longitudinally moveably supported therein.

Figure 6:
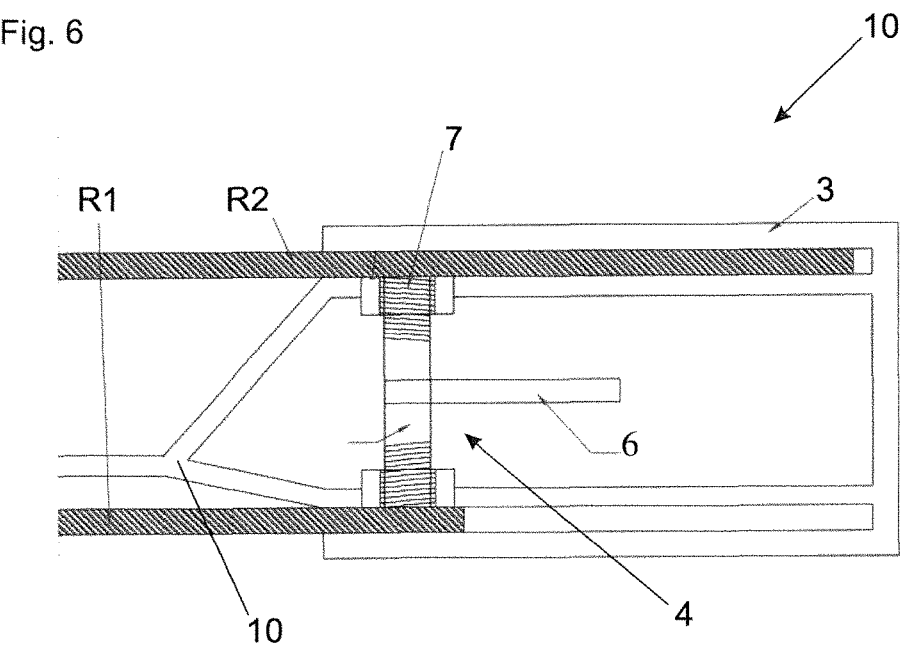
FIG. 6 shows an arresting device with actuator.

FIG. 6 shows the arresting device 4 in the end portion 3 of the rail system 10. This drawing shows how a spindle 7 is moved by an actuator 6, the spindle 7 having a thread at both ends and thus being pressed against the guide rails R1, R2. The guide rails R1, R2 are inhibited in their mobility by the arresting device 4 of the guide rails R1, R2 being pressed against the body of the end portion 3.

Figure 7A:
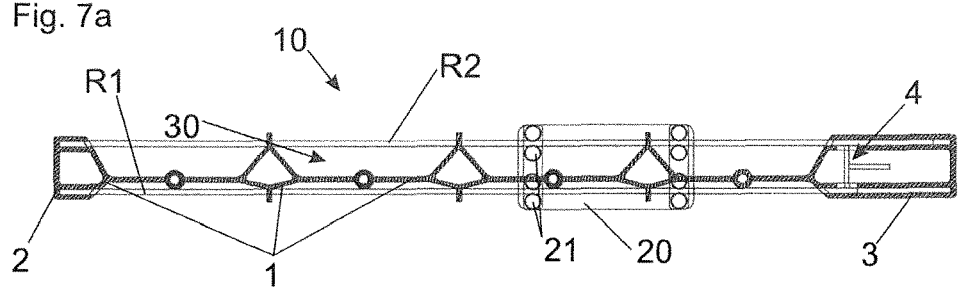
FIGS. 7a through 7c show various radii of curvature in the rail system.
Figure 7B:
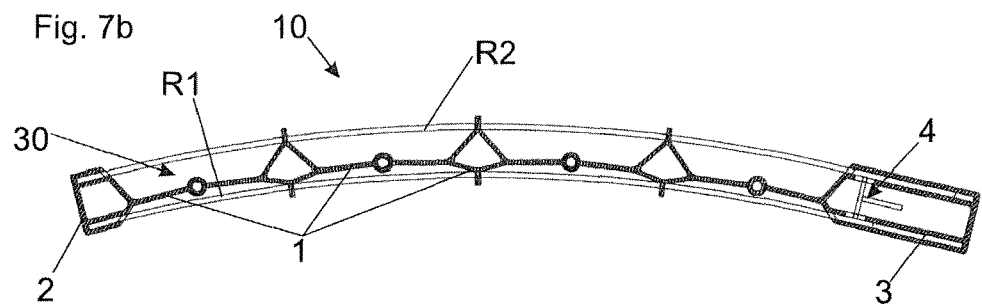
Figure 7C:
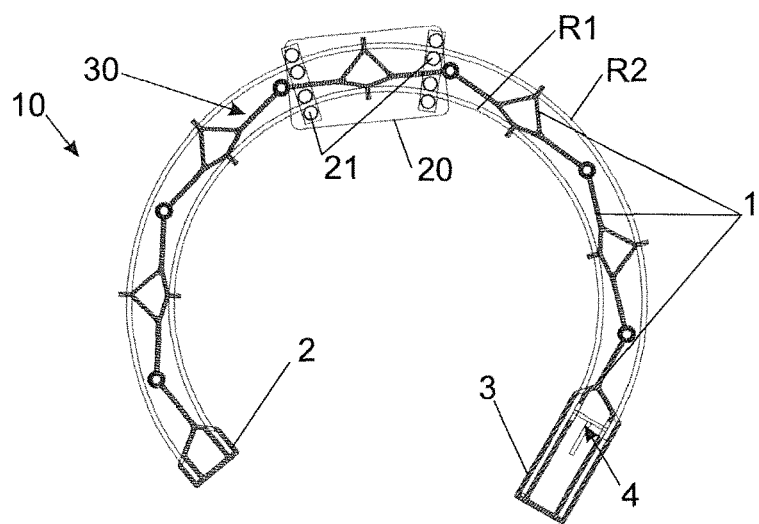

FIGS. 7a-7c show a rail system 10 in a stretched form. The camera slider 20 can move linearly along the rail system 10. The elongated form which is shown in FIG. 7a can also be retained by way of the arresting device 4. If that should be altered, the arresting device 4 is released and the rail system 10 is put into its desired form, as can be seen in FIG. 7b.

FIG. 7b shows a slightly curved shape of the rail system 10. In this case, the first guide rail R1 can move along the end portion 3, and is mounted longitudinally moveably in the individual segments 1 and also in the end portion 3. That also applies to the second guide rail R2 which is already stretched in this slightly curved configuration. A part of the second guide rail R2 is moved out of its position in the end portion 3 in that case. If that form is to be retained, then the system is blocked in the desired form by the arresting device 4.

FIG. 7c shows a heavily pronounced circular arc of the rail system 10. In the end portion 3, the first guide rail R1 has been inserted in the end portion 3 as far as a condition of abutment, and the outer second guide rail R2 has been pulled out of the end portion 3 until reaching a condition of abutment. The camera slider 20 can be moved along the circular path by the rollers 21. If the form is to be retained, the rail system 10 is blocked by the arresting device. That form could, however, also be held by the pulling element 5 (not shown in FIG. 7c), as illustrated in FIG. 5.

Figure 8:
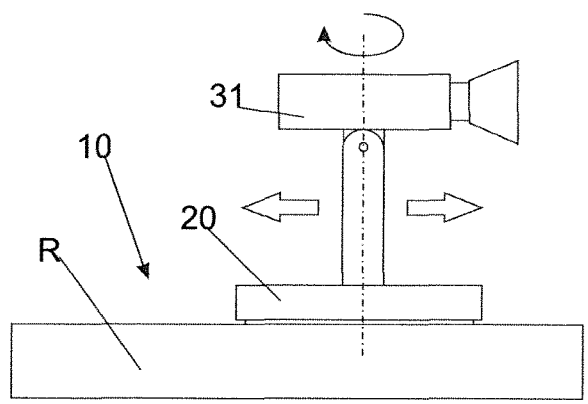
FIG. 8 shows a diagrammatic side view of a camera slider, camera and guide rail.

FIG. 8 shows a camera 31 on a displaceable camera slider 20 mounted on at least one guide rail R by rollers 21 (not visible in FIG. 8).

Figure 9:
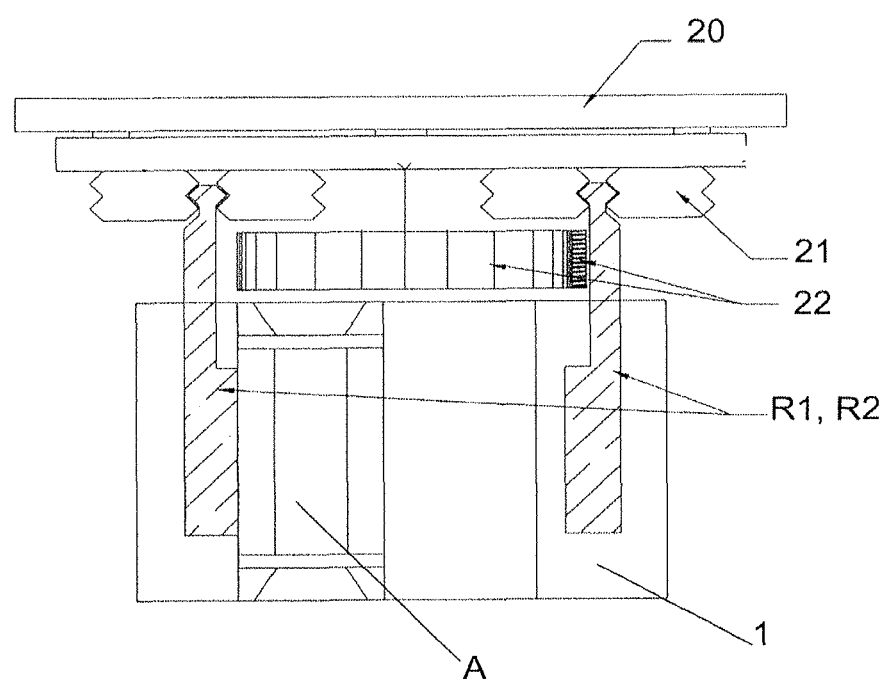
FIG. 9 shows a sectional view of a rail system and camera slider.

FIG. 9 shows a sectional view of the rail system 10. In this case, the rollers 21 are shaped so that they involve a positively locking engagement with the guide rails R1, R2. That therefore prevents the camera or the camera slider 20 from tipping over (i.e., prevents the rollers from lifting off of the guide rails R1, R2). FIG. 9 also shows a drive unit 22 which moves the camera slider 20 along the guide rails R1, R2. In this case, the movement of the camera slider 20 can be implemented by a control device or manually. The drive unit 22 can be effected, for example, by a belt drive, a chain drive, or also by at least one friction wheel which is in contact with one of the guide rails R and is driven by a motor fixed to the camera slider 20.

Figure 10:
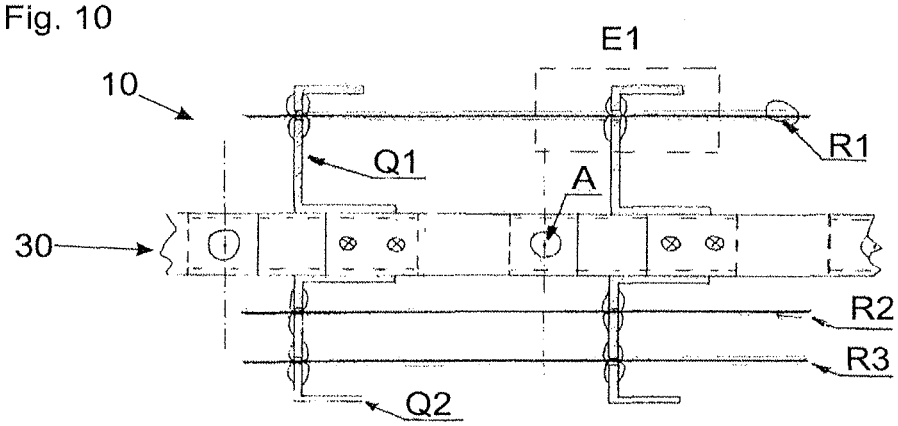
FIG. 10 shows a plan view of a rail system.

FIG. 10 shows the carrier structure 30 of a rail system 10. The guide rails R1, R2, R3 are in this case arranged longitudinally moveably on the carrier structure 30.

Figure 11:
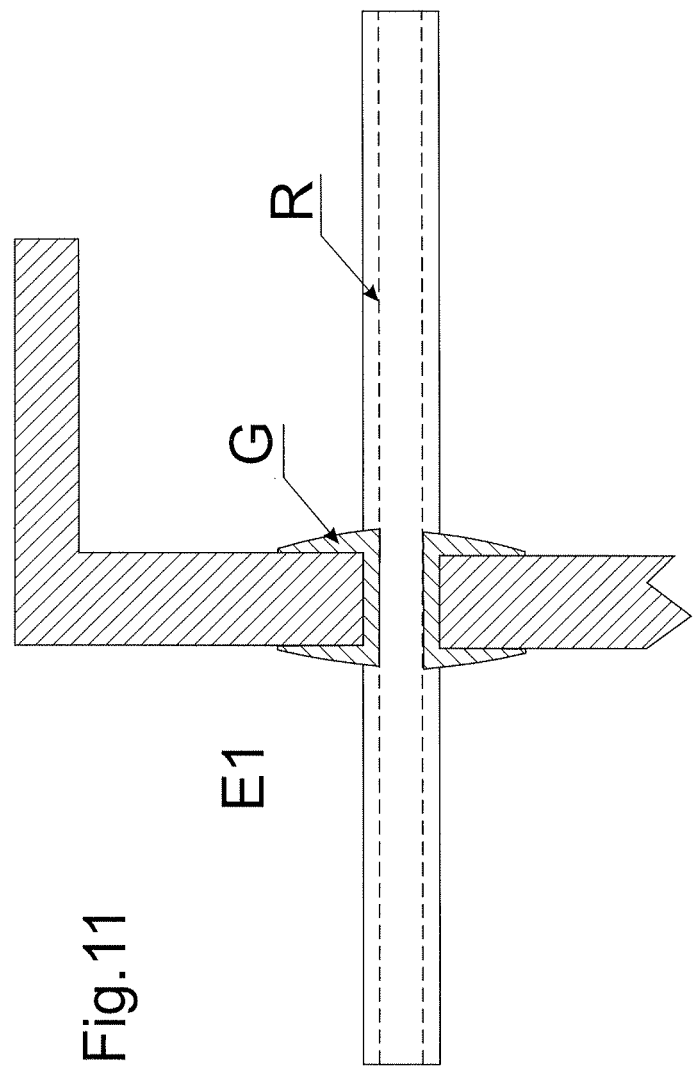
FIG. 11 shows a detail view of an insert.

FIG. 11 shows a detail from FIG. 10 relating to the region E1. The detail shows the insert G which, for example, comprises plastic like Teflon or another slidable material (i.e., a material for reducing friction to allow relative movement between guide rail R and the carrier structure 30). That insert G facilitates displacement of the guide rail R in relation to the carrier structure 30. The carrier structure 30 which is produced by individual segments 1 which are connected together by the axis member A has side devices Q1, Q2. Disposed in those side devices Q1, Q2 are the inserts G which facilitate the displacement of the guide rails R1, R2, R3.

FIG. 12 again shows a heavily curved circular path of the rail system 10. The individual segments 1 are connected together by the axis members A. Stretching and upsetting at the guide rails R1, R2, R3 is compensated for by their longitudinal mobility relative to the carrier structure 30 and to the individual segments 1 thereof.

Figure 13:
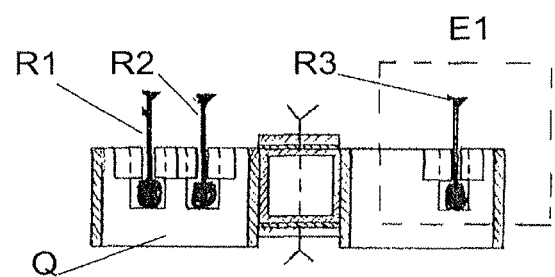
FIG. 13 shows a sectional view of a rail system.

FIG. 13 shows a sectional view of an embodiment. The side devices Q of the individual structures have recesses for receiving the guide rails R1, R2, R3. The region E1 is shown in detail in FIG. 14.

Figure 14:
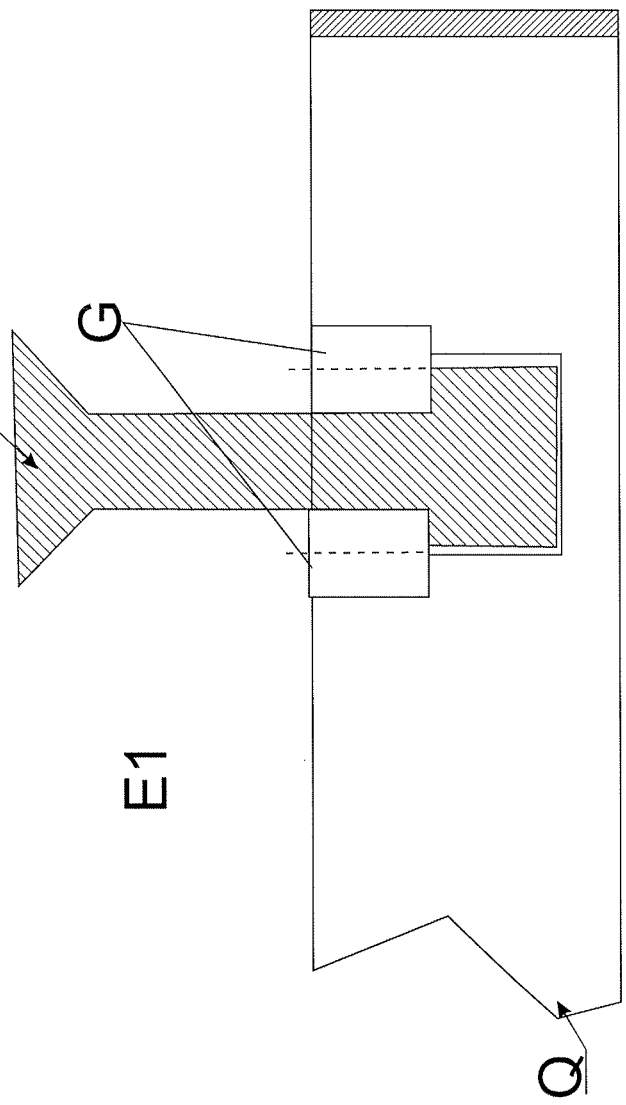
FIG. 14 shows a guide rail in insert, FIG. 15 diagrammatically shows a camera slider on a guide rail.

FIG. 14 shows the inserts G in the region E1, which facilitate easy displacement of the guide rails R1, R2, R3.

Figure 15:
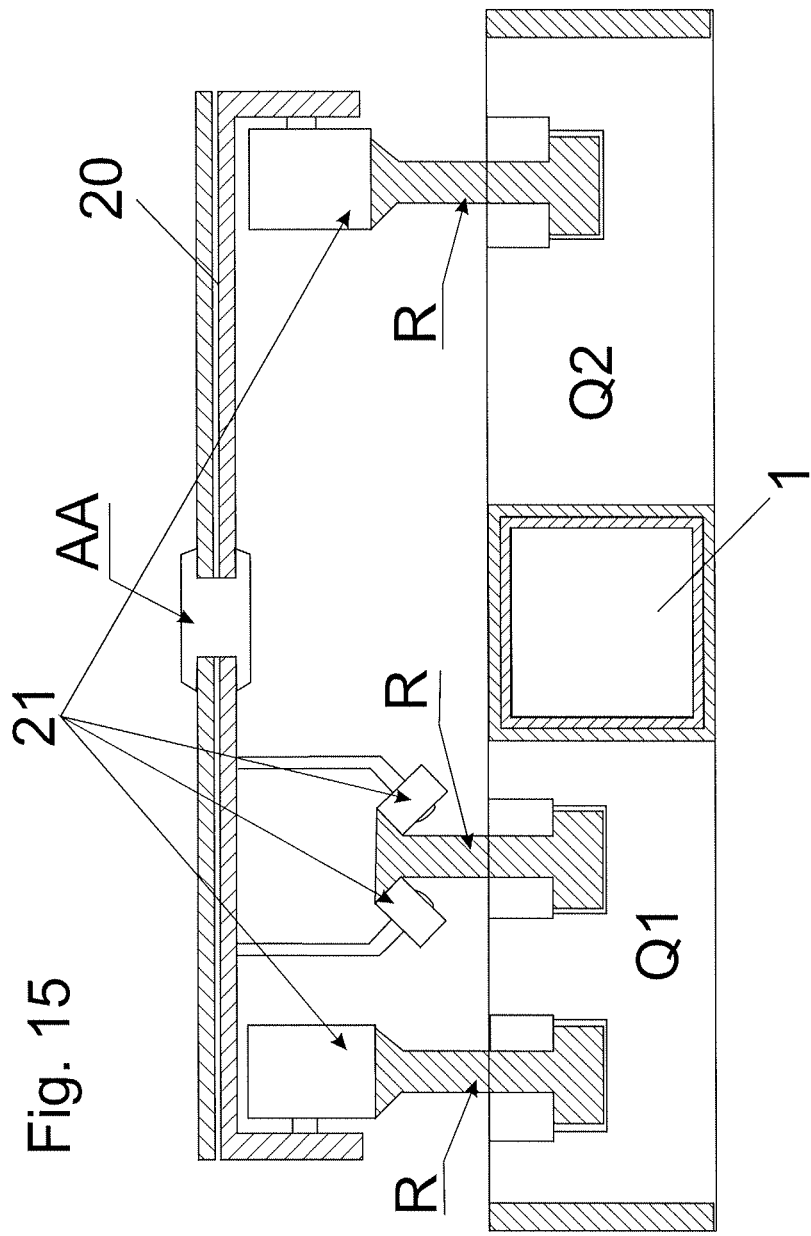

FIG. 15 shows a further embodiment of a rail system 10. In this case, the rollers 21 are so arranged that the camera slider 20 cannot drop off guide rails R. A camera mounting element AA is disposed on the camera slider 20. The guide rails R are fixed moveably in the side devices Q1, Q2, which are provided by the segments 1 of the carrier structure 0.

Figure 16:
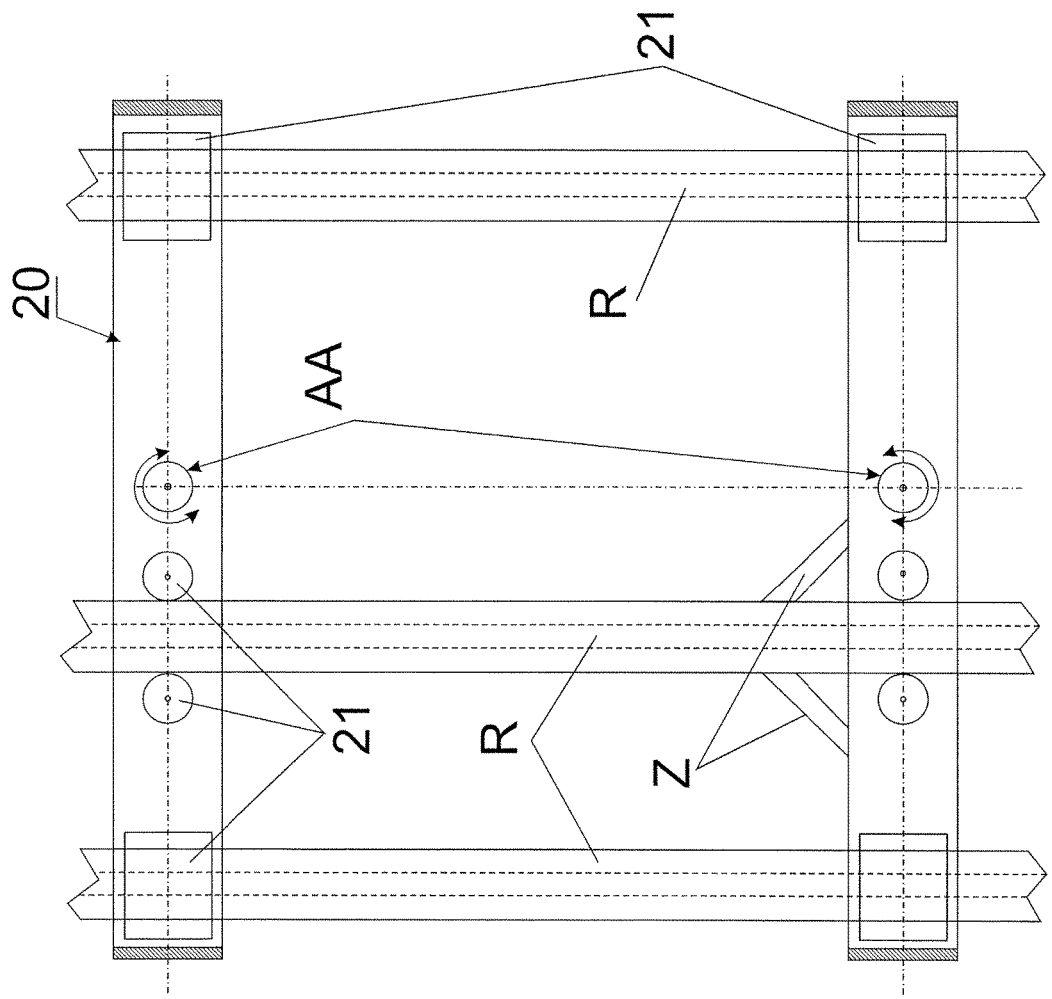
FIG. 16 shows a view from below of a rail system with camera slider.

FIG. 16 shows a view from below of the guide rails R, with a camera slider which is displaceable thereon and which is connected to the rails R by rollers 21. In this case, a guide member Z prevents uncontrolled pivotal movement of the camera slider 20 in relation to the guide rails R.

The invention claimed is:

1. A rail system comprising:
    a guide rail;
    a camera slider displaceably mounted on said guide rail, said camera slider having a camera mounted thereon; and
    a carrier structure comprising a plurality of hingedly interconnected segments arranged along said guide rail, said segments being connected to and supporting said guide rail, said plurality of segments being connected together by elongated pivot pins, and each of said pivot pins having a longitudinal axis perpendicular to a longitudinal axis of said carrier structure such that said plurality of segments are rotatable relative to each other only within a single plane of said carrier structure;
    wherein the guide rail is flexible and each of the segments of the carrier structure is non-flexible.

2. The rail system as set forth in claim 1, wherein said guide rail is a first flexible guide rail, said rail system further comprising a second flexible guide rail connected to said carrier structure such that said carrier structure is located between said first flexible guide rail and said second flexible guide rail.

3. The rail system as set forth in claim 1, wherein said guide rail is mounted moveably relative to said carrier structure.

4. The rail system as set forth in claim 3, wherein said guide rail is mounted slidably relative to said carrier structure.

5. The rail system as set forth in claim 3, further comprising an arresting device for holding said guide rail in position relative to said carrier structure.

6. The rail system as set forth in claim 5, further comprising an end portion for holding and guiding an end of said guide rail and an end of said carrier structure, said arresting device being located in said end portion.

7. The rail system as set forth in claim 1, further comprising an end portion for holding and guiding an end of said guide rail and an end of said carrier structure, said guide rail being mounted moveably in said end portion.

8. The rail system as set forth in claim 7, wherein said guide rail is mounted slidably in said end portion.

9. The rail system as set forth in claim 1, wherein said guide rail is formed from at least one of a flexible plastic, a plastic compound, and a flexible metal.

10. The rail system as set forth in claim 1, wherein said camera slider has rollers mounted to said guide rail, each of said rollers having one of rolling bearings and sliding bearings.

11. The rail system as set forth in claim 10, wherein said camera slider is configured such that axes of rotation of said rollers are arranged in at least one of a horizontal plane and in an angled plane differing from the horizontal plane, and said rollers being on at least one of said camera slider and said guide rail.

12. The rail system as set forth in claim 10, wherein said rollers and guide rail are shaped so as to be in locking engagement with each other to prevent said rollers from lifting off said guide rail.

13. The rail system as set forth in claim 1, further comprising a drive unit for displacing said camera slider along said guide rail.

14. The rail system as set forth in claim 13, wherein said drive unit is an electric motor.

15. The rail system as set forth in claim 1, wherein said carrier structure has side devices including inserts for supporting said guide rail, said inserts being formed of a material for reducing friction to allow relative movement between said guide rail and said carrier structure.

16. A rail system comprising:
    a guide rail;
    a camera slider displaceably mounted on said guide rail, said camera slider having a camera mounted thereon; and
    a carrier structure comprising a plurality of hingedly interconnected segments arranged along said guide rail, said segments being connected to and supporting said guide rail, said plurality of segments being connected together by elongated axis members, and each of said axis members having a longitudinal axis perpendicular to a longitudinal axis of said carrier structure such that said plurality of segments are rotatable relative to each other only within a horizontal plane of said carrier structure;

wherein the guide rail is flexible and each of the segments of the carrier structure is non-flexible.

* * * * *